(12) United States Patent
Ehrlich

(10) Patent No.: US 7,180,696 B2
(45) Date of Patent: *Feb. 20, 2007

(54) METHODS FOR SELECTIVE MULTI-PASS SERVOWRITING AND SELF-SERVOWRITING

(75) Inventor: Richard M. Ehrlich, Saratoga, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/818,472

(22) Filed: Apr. 5, 2004

(65) Prior Publication Data

US 2005/0237658 A1    Oct. 27, 2005

Related U.S. Application Data

(63) Continuation of application No. 10/622,215, filed on Jul. 18, 2003, now abandoned.

(60) Provisional application No. 60/436,740, filed on Dec. 27, 2002, provisional application No. 60/436,673, filed on Dec. 27, 2002.

(51) Int. Cl.
G11B 21/02  (2006.01)
G11B 5/58   (2006.01)
G11B 5/596  (2006.01)

(52) U.S. Cl. .................. 360/75; 360/77.01; 360/78.04
(58) Field of Classification Search .................. None
See application file for complete search history.

(56) References Cited

U.S. PATENT DOCUMENTS

| | | | |
|---|---|---|---|
| 5,107,378 A | | 4/1992 | Cronch et al. ................ 360/45 |
| 5,946,157 A | * | 8/1999 | Codilian et al. ............... 360/75 |
| 5,966,264 A | | 10/1999 | Belser et al. ............ 360/77.08 |
| 6,023,389 A | | 2/2000 | Cunningham ................ 360/75 |
| 6,025,970 A | | 2/2000 | Cheung .................... 360/77.08 |
| 6,411,459 B1 | | 6/2002 | Belser et al. .................. 360/75 |
| 6,445,521 B1 | | 9/2002 | Schaff et al. .................. 360/31 |
| 6,600,620 B1 | * | 7/2003 | Krounbi et al. ............... 360/75 |
| 2002/0135927 A1 | | 9/2002 | Yatsu |
| 2003/0161061 A1 | | 8/2003 | Lamberts |
| 2004/0123025 A1 | * | 6/2004 | Chainer et al. ............. 711/112 |
| 2005/0237657 A1 | * | 10/2005 | Ehrlich ........................ 360/75 |

FOREIGN PATENT DOCUMENTS

| | | |
|---|---|---|
| JP | 61211814 | 9/1986 |
| JP | 63025803 | 2/1988 |
| JP | 10334402 | 12/1998 |

* cited by examiner

Primary Examiner—Hoa T. Nguyen
Assistant Examiner—Jason Olson
(74) Attorney, Agent, or Firm—Fliesler Meyer LLP

(57) ABSTRACT

The amount of position error written into a servo burst pattern can be reduced by using additional media revolutions to write the pattern. Where the edges of two servo bursts are used to define a position on the media, trimming the first burst and writing the second burst on separate revolutions will result in a different amount of position error being written into each burst. The end result will be a reduction in the overall error in position information. In order to further reduce the position error given by a burst pair, each burst also can be trimmed and/or written in multiple passes. This description is not intended to be a complete description of, or limit the scope of, the invention. Other features, aspects, and objects of the invention can be obtained from a review of the specification, the figures, and the claims.

11 Claims, 12 Drawing Sheets

METHODS FOR SELECTIVE MULTI-PASS SERVOWRITING AND SELF-SERVOWRITING

CLAIM OF PRIORITY

This application is a continuation application of U.S. patent application Ser. No. 10/622,215, filed Jul. 18, 2003 now abandoned, which claims benefit from U.S. Provisional Patent Application No. 60/436,740, filed Dec. 27, 2002 and U.S. Provisional Patent Application No. 60/436,673, filed Dec. 27, 2002, all of which are incorporated herein by reference.

CROSS-REFERENCE TO RELATED APPLICATIONS

The following applications are cross-referenced and incorporated herein by reference:

U.S. Provisional Patent Application No. 60/436,712 entitled "Systems for Self-Servowriting Using Write-Current Variation," by Richard M. Ehrlich, filed Dec. 27, 2002.

U.S. Provisional Patent Application No. 60/436,703 entitled "Methods for Self-Servowriting Using Write-Current Variation," by Richard M. Ehrlich, filed Dec. 27, 2002.

U.S. patent application Ser. No. 10/420,076 entitled "Systems for Self-Servowriting Using Write-Current Variation," by Richard M. Ehrlich, filed Apr. 22, 2003.

U.S. patent application Ser. No. 10/420,498 entitled "Methods for Self-Servowriting Using Write-Current Variation," by Richard M. Ehrlich, filed Apr. 22, 2003.

U.S. patent application Ser. No. 10/818,473, entitled "Systems for Self-Servowriting Using Write-Current Variation," by Richard M. Ehrlich, filed Apr. 5, 2004.

U.S. patent application Ser. No. 10/818,174, entitled "Methods for Self-Servowriting Using Write-Current Variation," by Richard M. Ehrlich, filed Apr. 5, 2004.

U.S. Provisional Patent Application No. 60/436,709 entitled "Systems for Multi-Pass Self-Servowriting," by Richard M. Ehrlich, filed Dec. 27, 2002.

U.S. Provisional Patent Application No. 60/436,743 entitled "Methods for Multi-Pass Self-Servowriting," by Richard M. Ehrlich, filed Dec. 27, 2002.

U.S. patent application Ser. No. 10/420,452 entitled "Systems for Self-Servowriting With Multiple Passes Per Servowriting Step," by Richard M. Ehrlich, filed Apr. 22, 2003.

U.S. patent application Ser. No. 10/420,127 entitled "Methods for Self-Servowriting With Multiple Passes Per Servowriting Step," by Richard M. Ehrlich, filed Apr. 22, 2003.

U.S. patent application Ser. No. 10/818,181, entitled "Systems for Self-Servowriting With Multiple Passes Per Servowriting Step," by Richard M. Ehrlick, filed Apr. 5, 2004.

U.S. patent application Ser. No. 10/818,185, entitled "Methods for Self-Servowriting With Multiple Passes Per Servowriting Step," by Richard M. Ehrlich, filed Apr. 5, 2004.

U.S. Provisional Patent Application No. 60/436,744 entitled "Systems Using Extended Servo Patterns with Multi-Pass Servowriting and Self-Servowriting," by Richard M. Ehrlich, filed Dec. 27, 2002.

U.S. Provisional Patent Application No. 60/436,704 entitled "Methods Using Extended Servo Patterns with Multi-Pass Servowriting and Self-Servowriting," by Richard M. Ehrlich, filed Dec. 27, 2002.

U.S. patent application Ser. No. 10/630,523 entitled "Systems Using Extended Servo Patterns with Multi-Pass Servowriting and Self-Servowriting," by Richard M. Ehrlich, filed Jul. 30, 2003.

U.S. patent application Ser. No. 10/630,528 entitled "Methods Using Extended Servo Patterns with Multi-Pass Servowriting and Self-Servowriting," by Richard M. Ehrlich, filed Jul. 30, 2003.

U.S. patent application Ser. No. 10/630,521 entitled "Systems Using Extended Servo Patterns with Variable Multi-Pass Servowriting and Self-Servowriting," by Richard M. Ehrlich, filed Jul. 30, 2003.

U.S. patent application Ser. No. 10/630,524 entitled "Methods Using Extended Servo Patterns with Variable Multi-Pass Servowriting and Self-Servowriting," by Richard M. Ehrlich, filed Jul. 30, 2003.

U.S. patent application Ser. No. 10,818,180, entitled "Systems Using Extended Servo Patterns with Multi-Pass Servowriting and Self-Servowriting," by Richard M. Ehrlich, filed Apr. 5, 2004.

U.S. patent application Ser. No. 10/818,175, entitled "Methods Using Extended Servo Patterns with Multi-Pass Servowriting and Self-Servowriting," by Richard M. Ehrlich, filed Apr. 5, 2004.

U.S. patent application Ser. No. 10/818,445, entitled "Systems Using Extended Servo Patterns with Variable Multi-Pass Servowriting and Self-Servowriting," by Richard M. Ehrlich, filed Apr. 5, 2004.

U.S. patent application Ser. No. 10/818,179, entitled "Methods Using Extended Servo Patterns with Variable Multi-Pass Servowriting and Self-Servowriting," by Richard M. Ehrlich, filed Apr. 5, 2004.

U.S. patent application Ser. No. 10/622,233 entitled "Systems for Selective Multi-Pass Servowriting and Self-Servowriting," by Richard M. Ehrlich, filed Jul. 18, 2003.

U.S. patent application Ser. No. 10/630,218 entitled "Systems for Variable Multi-Pass Servowriting and Self-Servowriting," by Richard M. Ehrlich, filed Jul. 30, 2003.

U.S. patent application Ser. No. 10/630,522 entitled "Methods for Variable Multi-Pass Servowriting and Self-Servowriting," by Richard M. Ehrlich, filed Jul. 30, 2003.

U.S. patent application Ser. No. 10/818,450, entitled "Systems for Selective Multi-Pass Servowriting and Self-Servowriting," by Richard M. Ehrlich, filed Apr. 5, 2004.

U.S. patent application Ser. No. 10/818,446, entitled "Systems for Variable Multi-Pass Servowriting and Self-Servowriting," by Richard M. Ehrlich, filed Apr. 5, 2004.

U.S. patent application Ser. No. 10,818,177, entitled "Methods for Variable Multi-Pass Servowriting and Self-Servowriting," by Richard M. Ehrlich, filed Apr. 5, 2004.

FIELD OF THE INVENTION

The present invention relates to servowriting processes and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

BRIEF SUMMARY

Systems and methods in accordance with the present invention take advantage of multiple passes in servowriting and self-servowriting applications. These additional passes allow patterns such as servo burst pairs to be written and/or trimmed on separate passes. The additional passes reduce the written runout, as the average misplacement decreases when the number of passes increases. Each burst in a servo pattern can also be written and/or trimmed in multiple passes. Additional passes can also be used only for selected tracks or servo bursts on a disk.

Other features, aspects, and objects of the invention can be obtained from a review of the specification, the figures, and the claims.

DETAILED DESCRIPTION

Figure 1:
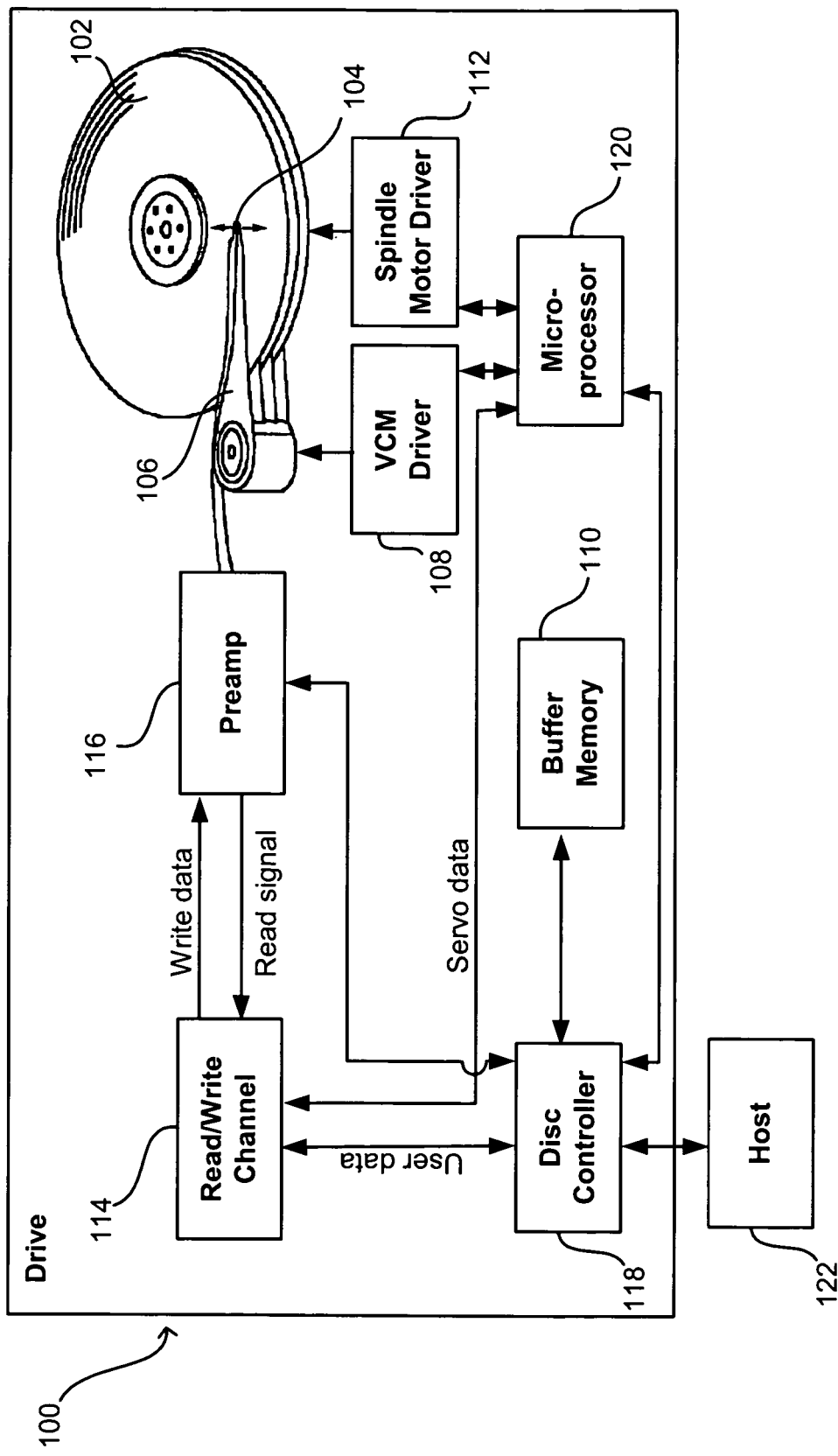
FIG. 1 is a diagram showing components of a disc drive that can be used in accordance with embodiments of the present invention.

Systems and methods in accordance with one embodiment of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer or Web server. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
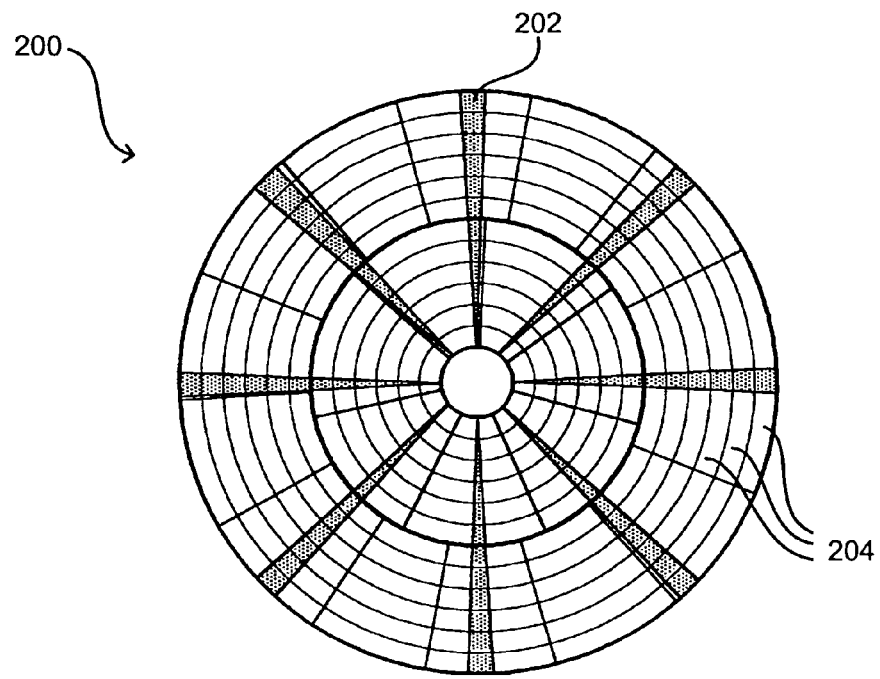
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data 206. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

Figure 3:
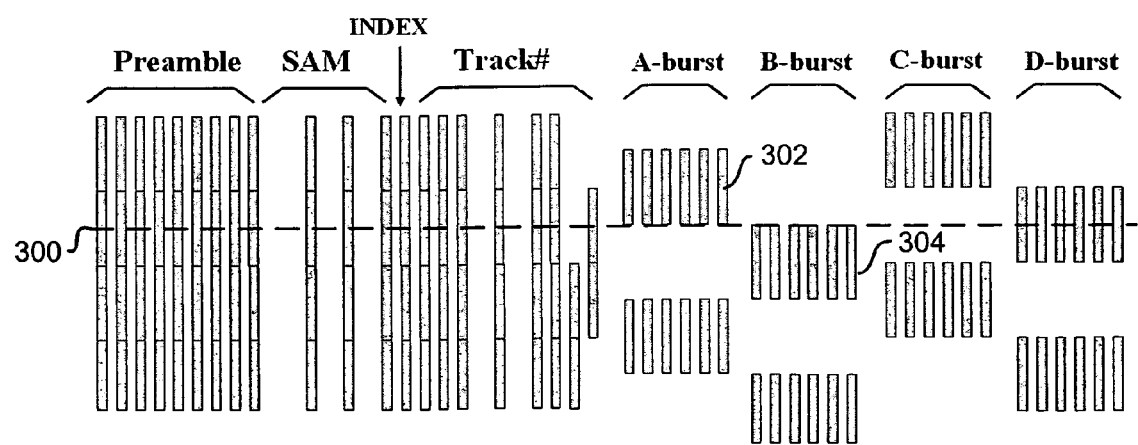
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

Systems and methods in accordance with embodiments of the present invention overcome deficiencies in prior art servowriting and self-servowriting systems by taking advantage of additional passes when writing servo information. The use of additional passes for the writing and/or trimming of servo burst patterns, for example, can provide for a low written-in runout in a servo pattern, but at the cost of some time-penalties in the servowriting and/or self-servowriting operations. The additional passes can achieve this reduced written-in runout by effectively making the written-in runout be the average of multiple servowriting passes. The time penalty due to the additional passes is small in self-servowriting processes, since a drive typically already spends many revolutions at each servowriting position in determination of the written-in runout of the reference pattern. One or two extra revolutions will only increase the self-servowriting time by a small fraction, such as on the order of about 16%–32%. Used with a standard servowriting process, each additional pass can add on the order of 75%.

FIGS. 4(a)–4(f) depict the progression of several steps of an exemplary servowriting process. The pattern shown in these figures is commonly referred to in the trade as a 3-pass-per-track, trimmed-burst pattern, for reasons described below. However, it is to be understood that for this specification the appropriate term is "3-step-per-track" or "3-servowriting-step-per-track". That is to say that each servowriting step can include one or multiple passes and each track is defined by one or multiple servowriting steps. Each figure depicts a small portion of the surface of a disk. This portion can contain several servo tracks, extending radially on the disk and vertically in the figures, and can cover the space of a single servo wedge, circumferentially on the disk and horizontally in the figures. A typical drive can have tens of thousands of servo tracks, and over one hundred wedges per revolution. In the figures, the patterned areas indicate portions of the surface of the disk that have been magnetized in one direction. Areas without patterning have been magnetized in another direction, typically in a direction opposite to that of the patterned areas. For drives which use longitudinal recording, the first direction will be substantially in the circumferential direction, and the second direction will be opposite to the first. For drives which use perpendicular recording (also referred to as "vertical recording"), the two directions are perpendicular to the plane of the disk. These simplified figures do not show effects of side-writing of the write element, which can produce non-longitudinal magnetization and erase bands. Such effects are not of primary importance to the discussion herein.

Figure 4A:
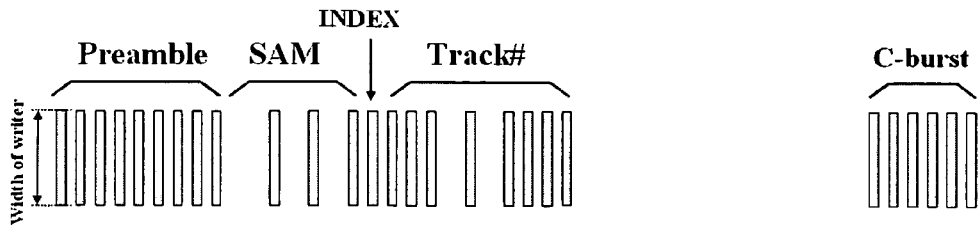
FIGS. 4(a)–(f) are diagrams of a servo-burst pattern being written over a progression of servowriting steps.

In FIG. 4(a), the result of a single servowriting step is shown. From that step, the servowriting head (passing from left to right in the figure) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4(a). An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head. Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information. The width of the written track can be determined by the magnetic write-width of the write element of the servowriting head.

Figure 4B:
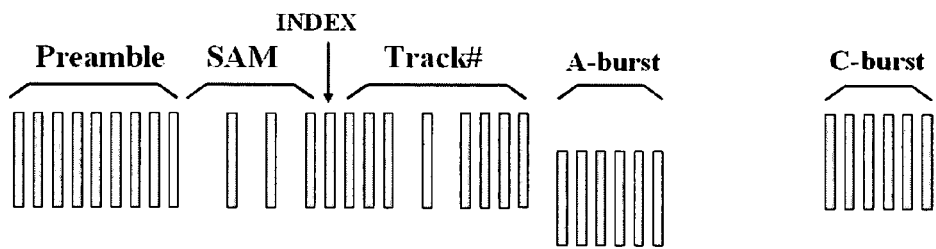

FIG. 4(b) shows the result of a second step of the servowriting process. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
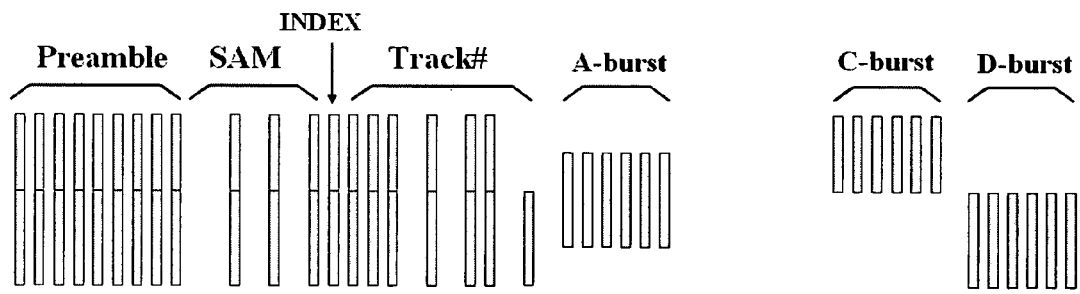

FIG. 4(c) shows the magnetization pattern after three steps of the servowriting process. The new portion of the pattern has been written with the servowriting head displaced another half servo track radially, for a total displacement of one servo-track, or two-thirds of a data-track, from the position of the head during the first servowriting step. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. As long as the servowriting head is at least two-thirds of a data-track in radial extent, the digital information will extend across the entire radial extent of the servowritten pattern. This trimming of the C-burst and writing of the D-burst created a common edge position or "boundary" between the two bursts.

Figure 4D:
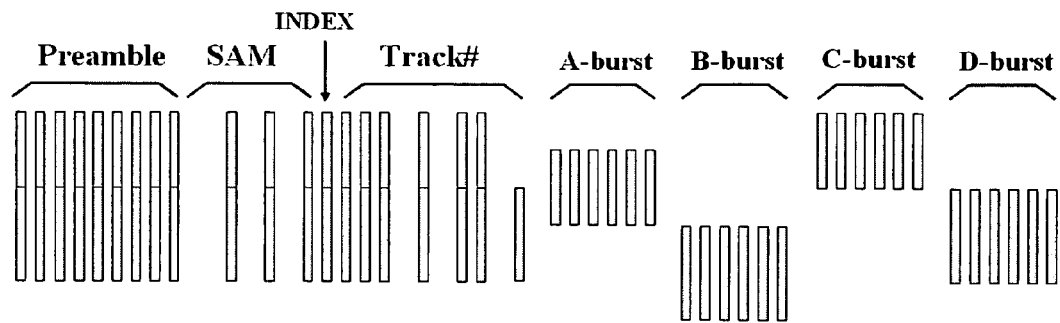

In FIG. 4(d), a B-burst has been added and the A-burst trimmed in the fourth step of the servowriting process. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, negative PES might indicate that the amplitude read from the A-burst is greater than the amplitude read from the B-burst. In this case, the head is too far above the center position (using the portion of the pattern in the figure) and should be moved radially downward/inward until the PES signal is approximately 0. It should be noted that for other portions of the pattern a B-burst could be above an A-burst, resulting in a negative amplitude contribution coming from the A-burst. Other burst-demodulation schemes have been proposed which determine the PES as a function of more than two burst amplitudes. Two examples of such schemes are disclosed in U.S. Pat. Nos. 6,122,133 and 5,781,361, which examples are incorporated herein by reference. Such schemes would also benefit from the current invention.

Figure 4E:
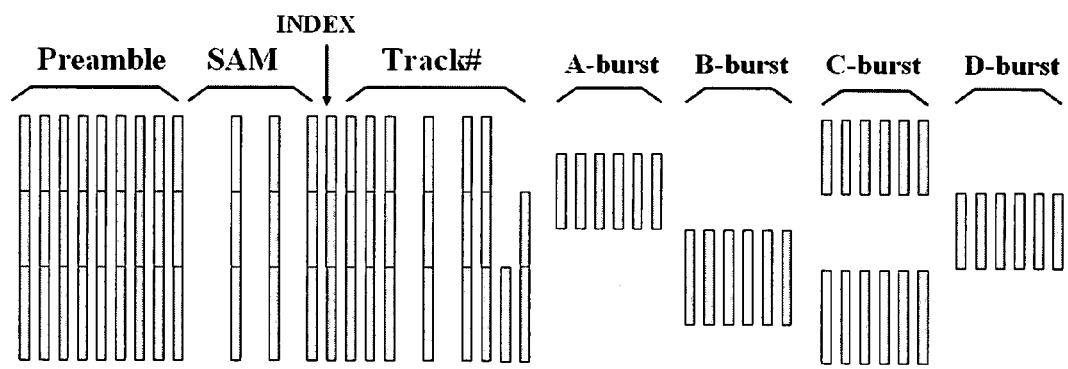
Figure 4F:
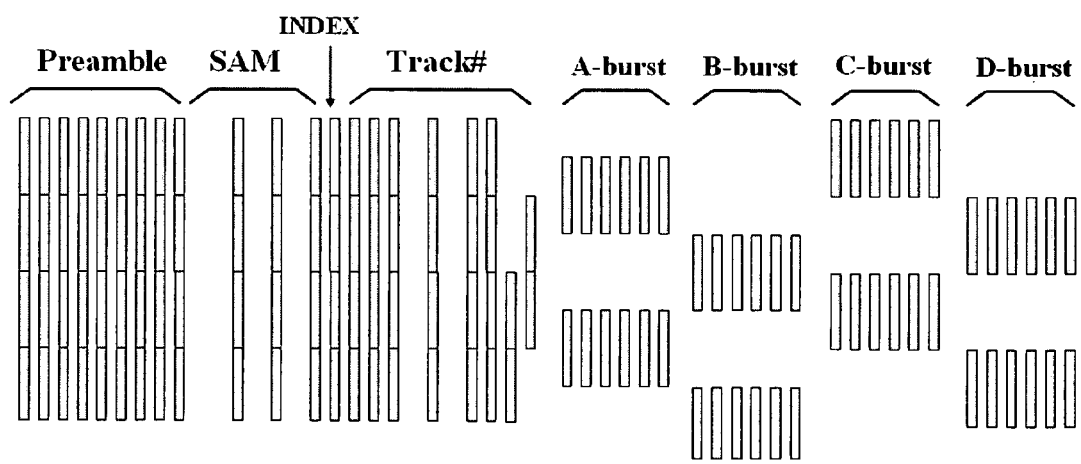

FIGS. 4(e) and 4(f) show the results of subsequent steps of the servowriting process, which has produced a number of servo tracks. After the first step in this process, each subsequent step writes one servo burst in a wedge and trims another. Every second step also writes digital information, including the SAM and track number. Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each servowriting step typically takes one full revolution to write all of the wedges for that step. Using this algorithm, then, servowriting can take about 1.25–1.5 revolutions per servowriting step. Since there are two servowriting steps per servo-track in this example, and 1.5 servo tracks per data-track, such a process requires 3 servowriting steps per data-track, or 3.75–4.5 revolutions per data-track. For purposes of subsequent discussion only, it will be assumed that the process takes 4 revolutions per data-track.

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive, as well as writing a servo pattern on the patterned surface, if desired. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

A typical replication process, in which a drive servos on the reference pattern and writes final servo patterns on all surfaces, takes place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a RAN head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks.

Many of the self-servowriting techniques, including those described above, require considerably more than four disk revolutions per data-track written, as the drive must spend considerable time at the start of each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular.

The information used to remove written-in runout from the track can be calculated, in one approach, by examining a number of parameters over a number of revolutions. These parameters can include wedge offset reduction field (WORF) data values. WORF data can be obtained, for example, by observing several revolutions of the position error signal (PES) and combining the PES with servo loop characteristics to estimate the written-in runout, such as of the reference track. It is also possible to synchronously average the PES, and combine the synchronously-averaged PES with servo loop characteristics to estimate the written-in runout. Various measurements can be made, as are known in the art, to characterize servo loop characteristics. Because the servo typically suffers both synchronous and non-synchronous runout, any measurement intended to determine the synchronous runout will be affected by the non-synchronous runout. If many revolutions of PES data are synchronously averaged, the effects of the non-synchronous runout can lessen, leaving substantially only synchronous runout. This allows better determination of, and subsequent elimination of, the written-in runout. Averaging many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive microcontroller memory for immediate use. During a self-servowriting operation, the drive may use the latter option by calculating the written-in runout on a reference track and applying it to the servo by the use of a table in microcontroller memory. Additional revolutions of PES measurements for the reference track can be used to reduce the effects of non-synchronous, or repeatable, runout.

As previously described, techniques for determining and removing written-in runout of a track will hereinafter be referred to as WORF technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

FIGS. 4(a)–(f), described above, show an idealized servowriting process in which the radial placement of the writer is virtually perfect during servowriting. In reality, the writer placement will not be perfect, even if the written-in runout of the reference pattern is completely removed, due to non-synchronous positioning errors. There are several sources of non-synchronous runout, which is commonly referred to in the industry as NRRO, or Non-Repeatable Runout. If the servowriting head suffers non-synchronous runout while writing servo wedges, that runout will be written into those wedges.

Figure 5:
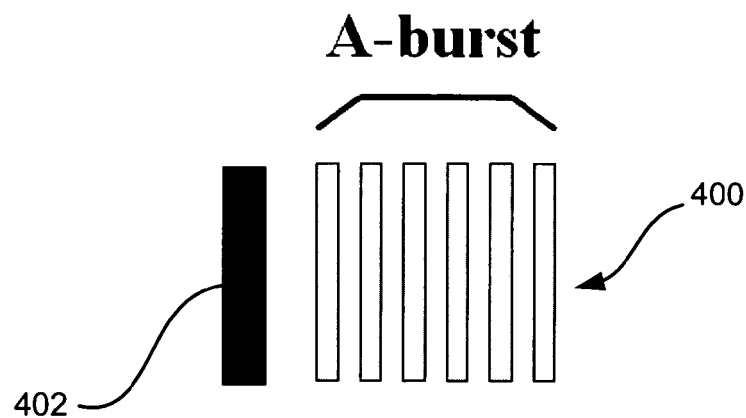
FIGS. 5 and 6 are diagrams of a servo-burst pattern being written over a progression of servowriting steps, wherein there is a head misplacement on the second step.
Figure 6:
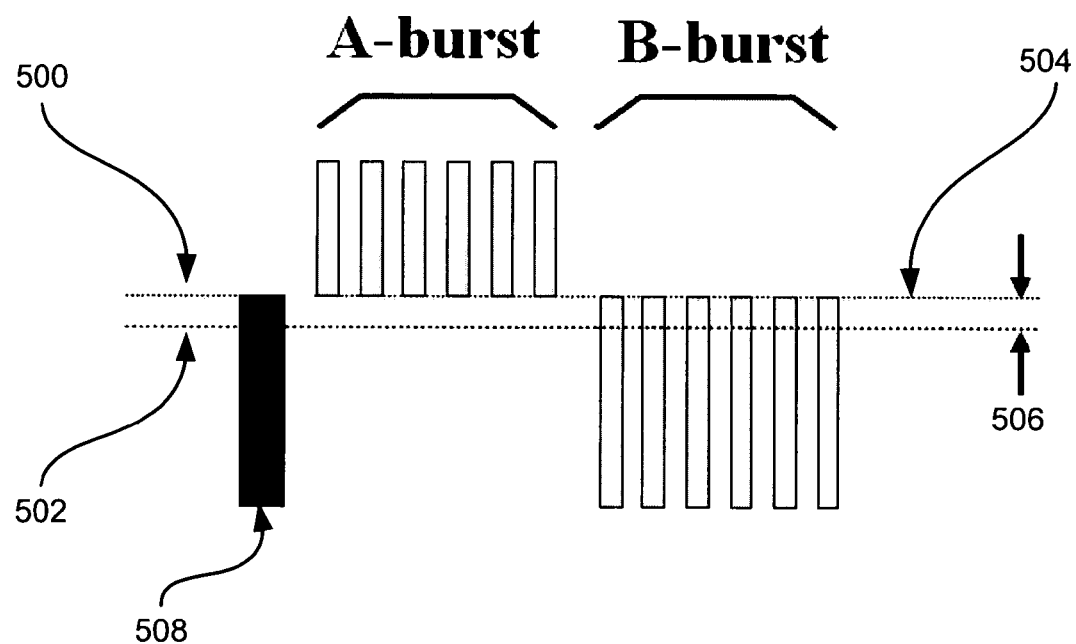

Such a result is illustrated in FIGS. 5 and 6. For the sake of simplicity, only A and B bursts are shown, leaving out the digital information and other bursts. In FIG. 5, the servowriter head 402 in a first servowriting step 400 writes an A-burst. In FIG. 6, the head 508 in a second servowriting step is offset, or mis-placed, a distance from its ideal position. For example, the ideal placement 502 of the top edge of the writer, and therefore the ideal placement of the servo track centerline, is shown a distance from the actual placement 500 of the top edge of the writer 508. This separation is the written-in runout 506.

Figure 8:
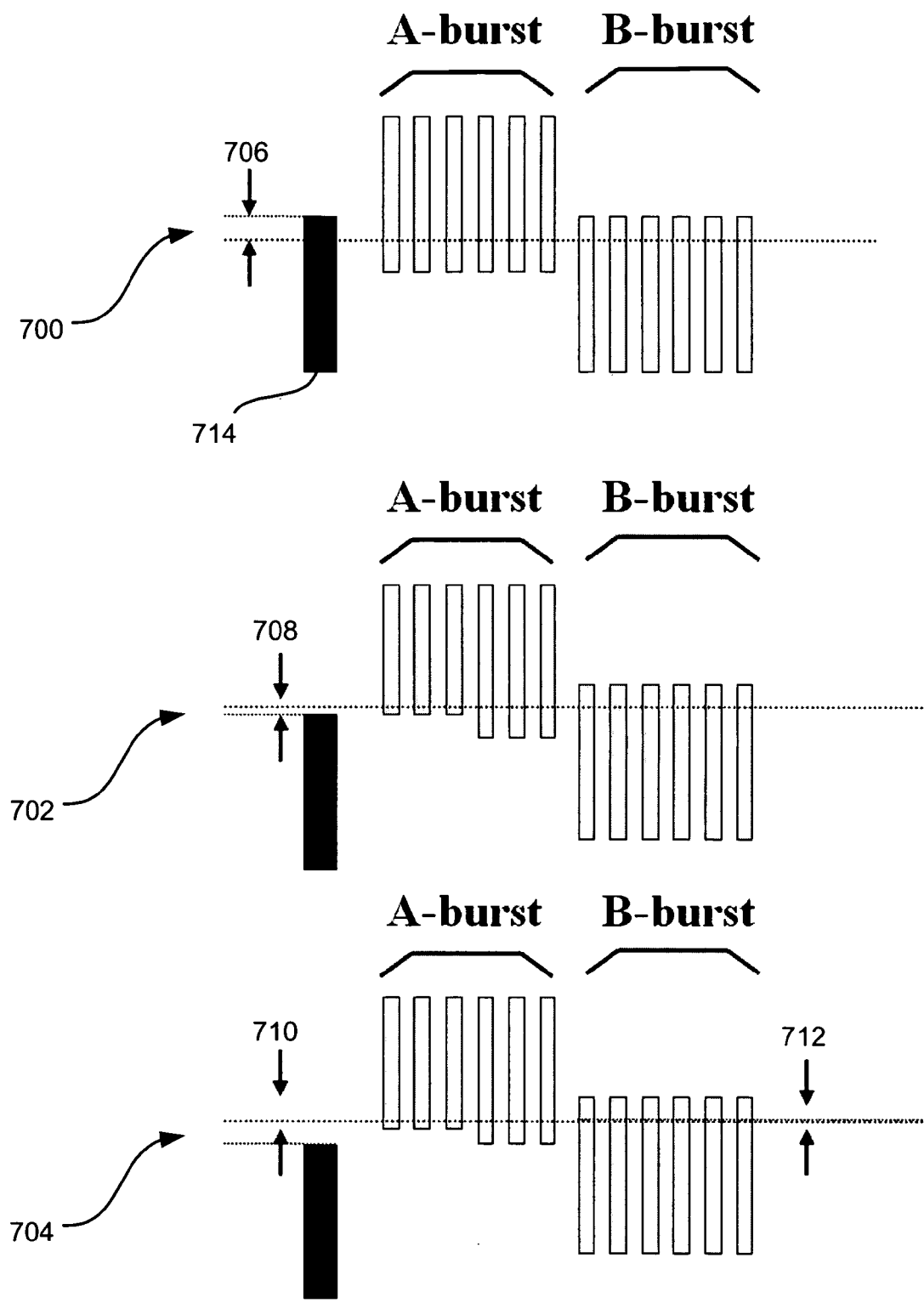
FIG. 8 is a diagram of a servo-burst pattern being written over a progression of servowriting steps using multiple passes in accordance with a second embodiment of the present invention.

An algorithm such as a typical quadrature servo detection algorithm can be used to determine the fractional track position of the R/W head by comparing the amplitudes of two bursts that are 180 Degrees out of phase with one another, such as the A-burst and B-burst in FIG. 8. Because existing servowriting processes involve trimming the A burst at the same time the B burst is written, any mis-placement of the writer during that revolution will result in equal mis-placement of their common edges. The written-in runout of that wedge, or the mis-placement of the center of the servo track, therefore will be equal to the mis-placement suffered by the writer at the time of writing of the wedge. If the only runout suffered by the writer is NRRO (i.e., if the written-in runout of the reference wedges is completely eliminated by the use of WORF technology), then the Root-Mean-Square (RMS) written-in runout will be equal to the RMS NRRO suffered by the writer during the servowriting process.

Figure 7:
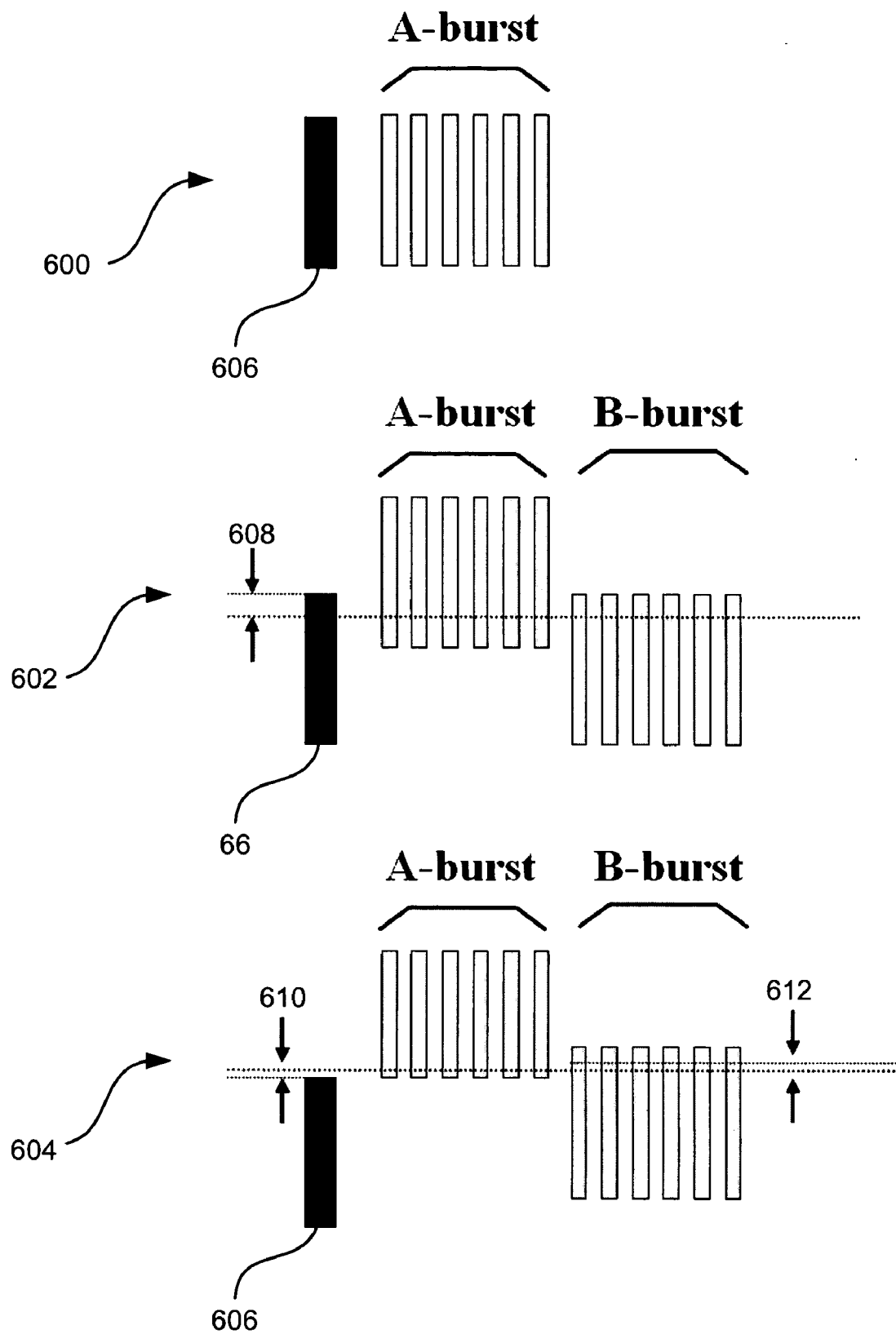
FIG. 7 is a diagram of a servo-burst pattern being written over a progression of servowriting steps using multiple passes in accordance with one embodiment of the present invention.

FIG. 7 depicts a process in accordance with one embodiment of the present invention by which the RMS written-in runout can be substantially reduced, at the cost of an extra revolution of the disk for each servowriting step. For such a servowriting operation, the writing of the B burst and the trimming of the A burst occur on separate revolutions of the disk (i.e., on separate passes) with the A burst and the B burst having a substantially common edge as an exactly common edge is generally impractical. The mis-placement of the upper edge of the B burst and the lower edge of the A burst, each of which are determined by the mis-placement of the writer during the corresponding revolutions of the disk, are quasi-independent random variables. If the runout suffered by the writer is indeed non-synchronous (NRRO), then the mis-placements of those two burst edges should not be the same from one revolution to the next. The mis-placement of the centerline of the servo track will be equal to the average of the misplacement of the upper edge of the B-burst and the lower edge of the A-burst.

For example, in the first servowriting step 600 of FIG. 7 the head 606 writes an A-burst. In a first pass of the second servowriting step 602, the head 606 writes a B-burst. The head is displaced a first distance 608 when writing the B-burst. In a second pass of the second servowriting step 604, the head is displaced a different distance 610 from the expected position when trimming the A-burst, leaving a smaller written-in runout 612 than would have occurred had the A-burst been trimmed and the B-burst written in a single pass of the second servowriting step 602 (which would have been approximately equal to the misplacement 608 on that pass). The A-burst also could have been trimmed before writing the B-burst.

It is well known that the average of two un-correlated random variables of RMS magnitude, $r_0$, as well as a mean value of zero, has an RMS magnitude of:

$$r_0/\sqrt{2}.$$

Whether or not the two misplacements are truly un-correlated depends upon the spectrum of the NRRO. Very low frequency NRRO components may have some correlation from revolution to revolution, but most NRRO components can be essentially un-correlated from one revolution to the next. Thus, by spending one extra revolution for each servowriting step, the servowriting process can achieve about a 29% reduction in the resulting written-in runout.

This approach can be extended, as shown in FIG. 8. On a second servowriting step 700, in which a B-burst is written, the head 714 has a first mis-placement 706. At the cost of yet another revolution, the trimming of the A burst can be done in two separate revolutions, trimming half of the burst in each revolution. On a second pass of the second servowriting step 702, half of the A-burst is trimmed with a second mis-placement 708. On a third pass of the second servowriting step 704, the other half of the A-burst is trimmed with a third mis-placement 710. The written-in runout 712 is then even smaller when three mis-placements are averaged. The track centerline being determined by the un-correlated writer misplacement over three separate revolutions can result in an additional reduction in written-in runout of about 13%. The concept can be further extended by trimming the A-burst in additional passes, such as by trimming a third of the A-burst in each of three passes.

The written-in runout also can be reduced by writing the B-burst in multiple passes, if the servowriting system is capable of writing magnetic transitions with very high timing coherence from revolution to revolution (i.e., it is capable of lining up the transitions from two separate revolutions very accurately). For example, the B-burst can be written by writing a third of the burst in each of three separate passes. The writing passes and trimming passes can involve doing all the writing then all the trimming, all the trimming then all the writing of new bursts, or alternating trimming and writing. If the separate portions of the B-burst are not circumferentially lined up very accurately, though, a burst-amplitude demodulation scheme could give an inaccurate measurement of the overall amplitude of the burst, and can actually increase the written-in runout. If the B-burst were to be split into two separate B-bursts, with each being demodulated separately and the amplitudes being averaged, then this would not be a problem. This could require a servo detection system that can accommodate more bursts, as well as additional overhead on the disk for the necessary space between the sub-bursts. If the techniques shown in FIGS. 7 or 8 are used, there is no need for extremely high coherency in servowriting.

If the embodiment depicted in FIG. 7 is applied to a standard servowriting operation done on a servowriter, one extra revolution per servowriting steps is required. With three servowriting steps per data-track, this will nearly double the time spent on a servowriter, jumping from four revolutions per data-track to seven. This is likely to be an unacceptable cost for most applications. If the same innovation is applied to a self-servowriting operation as described above, however, the relative increase in servowriting time is much smaller. Since the self-servowriting time is already nineteen revolutions per data-track, an additional three revolutions adds only about 16% to the self-servowriting time, which is much less expensive than servowriter time.

If the procedure depicted in FIG. 8 is applied to a servowriter or media-writer operation, the time will be 150% greater than the standard servowriter time, taking into consideration the original four revolutions per data track plus three additional revolutions for each of the two separate erases. In the self-servowriting case, the additional six revolutions per data-track add only about 32% to the time. While such a technique may add an unacceptable cost to a servowriter or media-writer process, the process may add an acceptable cost to a self-servowriting process.

Figure 9:
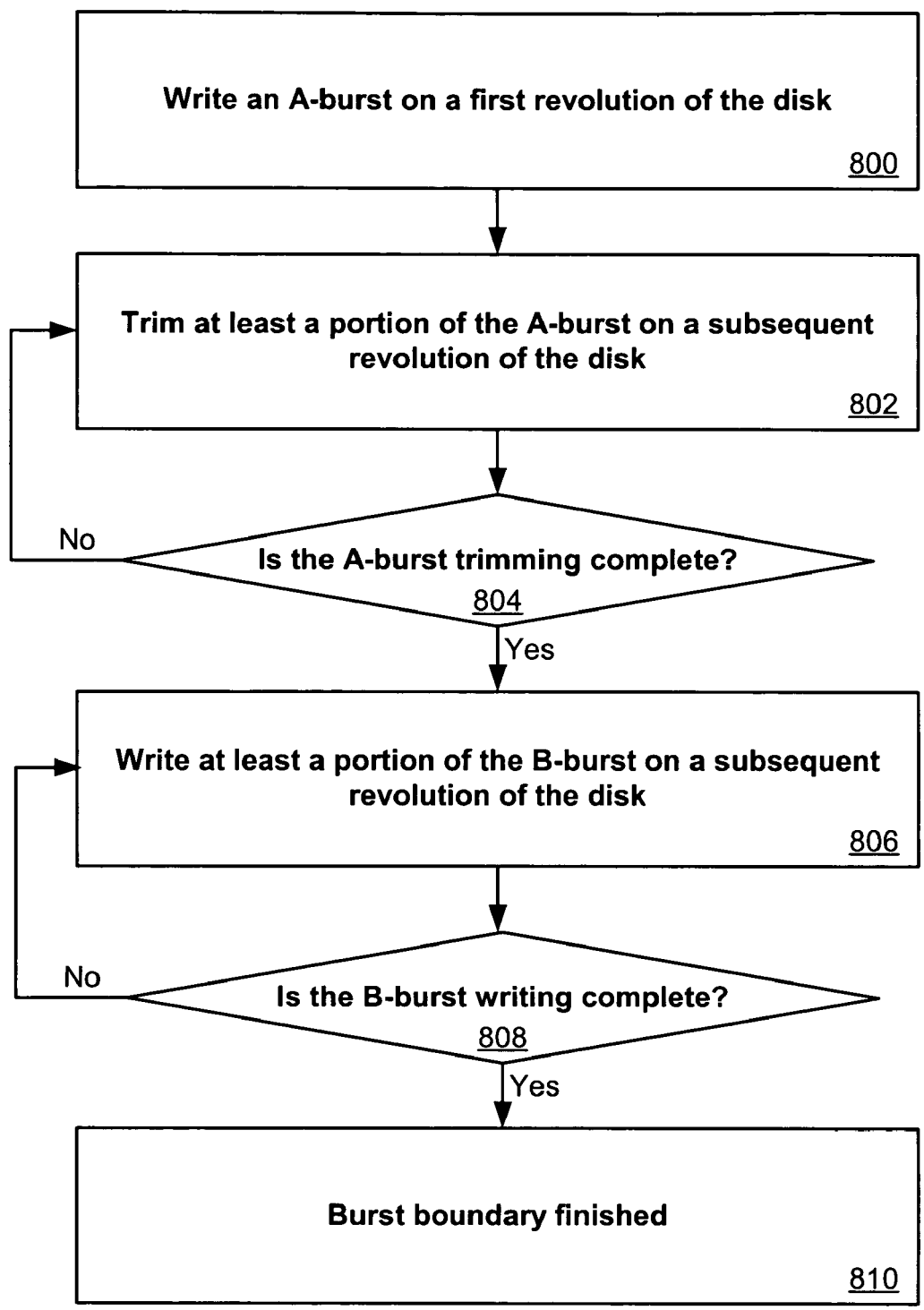
FIG. 9 is flowchart for a method that can be used with to write the patterns of FIGS. 7 and 8.

FIG. 9 shows a method that can be used in accordance with one embodiment of the present invention. In this exemplary method, the writing of an A-burst/B-burst boundary is described. It should be understood that the method can be used with any set of bursts in any order. In this method, an A-burst is written on a first revolution of a disk 800 upon which a servo pattern is to be written. At least a portion of the A-burst is trimmed on a subsequent rotation of the disk 802. If the A-burst is not completely trimmed 804, step 802 can be repeated until the entire A-burst is trimmed. At least a portion of the B-burst for the given burst boundary can be written on a subsequent revolution 806. If the B-burst is not completely written 808, step 806 can be repeated until the entire B-burst is written. The writing and trimming of the burst boundary is then complete 810. It should be understood, however, that steps 802–808 can be done in any reasonable order. For example, steps 806 and 808 for writing the B-burst can occur before steps 802 and 804 for trimming the A-burst. It is also possible to intersperse the writing of the B-burst with the trimming of the A-burst, such that you could write the A-burst, write at least a portion of the B-burst, trim at least a portion of the A-burst, then write another portion of the B-burst.

Additional Passes at Less than all Boundaries

In order to take advantage of the reduction in written-in runout without adding unacceptable cost, other embodiments in accordance with the present invention take advantage of additional servo passes only for specific burst boundaries or for specific servowriting steps. Such an embodiment can be a useful balance for certain applications where an improvement in head position control during write operations is desired, but the amount of extra time needed to take additional revolution(s) for each track is determined to be unacceptable or undesirable. For example, in FIG. 10 a series of A/B boundaries is used to define a centerline 900 for a track of data. The centerline 900 ideally passes through, adjacent to, or near an A/B boundary in each servo wedge on the disk as originally designed, although the subsequent removal of written in runout may cause a centerline to pass near other boundaries. Another such track centerline 906 is defined by a series of C/D boundaries in servo wedges about a disk. Other boundaries can define lines 902, 904 that may be used for purposes such as reading and/or positioning, but do not define track centerlines.

Instead of writing and trimming on separate revolutions of the disk for each burst boundary line, such as described above, it is possible to select certain boundary lines with which to utilize extra revolutions. For the non-selected boundary lines, it may be decided that the position error signal values are not critical enough to warrant the time/cost it would take to use additional servo passes to write and/or trim the bursts. For example, in FIG. 10 it might be decided that extra revolutions will be used for track centerlines 900, 906 because it is very important to write in approximately the desired location in order to avoid damaging data. It might be acceptable, however, to have greater uncertainty in read lines 902, 904 that are used for reading operations, as additional reads can be done without damaging data. If an incorrect PES results in an improper read operation, a number of things can be done as are known to those of ordinary skill in the art to attempt to properly read the data, such as moving the head slightly off track center while reading data during subsequent revolutions.

Figure 10:
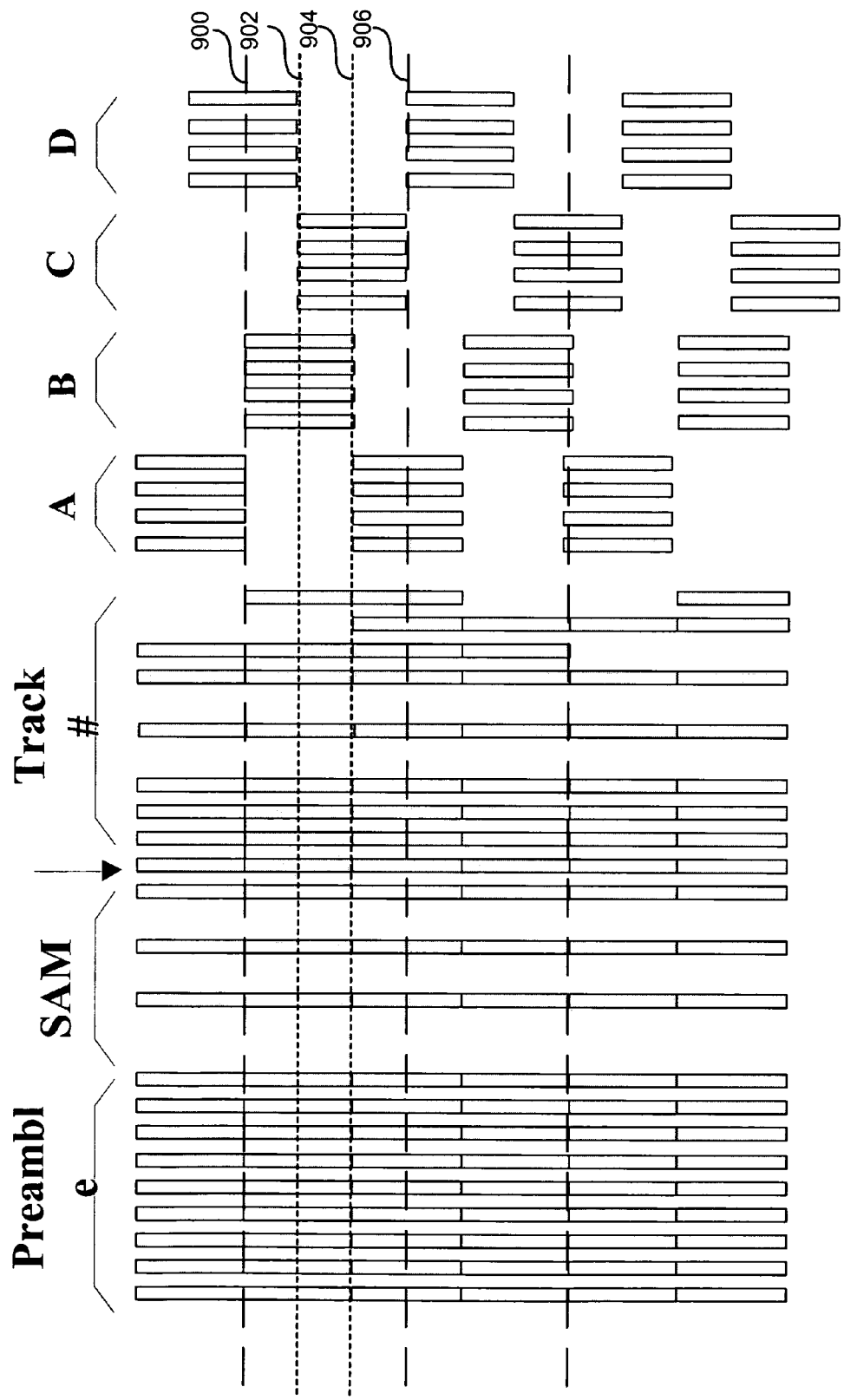
FIG. 10 is a diagram of a servo-burst pattern wherein a portion of the pattern is written over a progression of servowriting steps using multiple passes in accordance with a third embodiment of the present invention.

In the pattern of FIG. 10, which is a three-step per track pattern, (sometimes also referred to in the trade as a "three-pass per track" pattern) using such a method would mean that extra revolutions would only be used for every third servowriting step, such as servo tracks 900 and 906 of servo tracks 900, 902, 904, 906. In other patterns, the number of tracks utilizing extra passes could be increased or decreased accordingly. The use of extra passes for less than all servo tracks can be done for either servo writing or self-servowriting. In the case of servowriting, for a three pass per track pattern there are about four revolutions per track, as there are three full steps and about a third of a revolution per seek. Adding an additional pass to separately trim a burst at every servowriting step, for example, would increase the number of revolutions from four to seven, for about a 75% increase in passes and therefore servo time. This may be unacceptable on a servowriter where increasing write time can be very expensive. If, instead, the servowriter only uses an extra revolution for every data track center, or every third servowriting step in a three-pass-per-track servo pattern, then the increase in servo time is approximately 25%. This may be an acceptable trade-off to improve the written-in runout.

With a self-servowriting process, the additional overhead due to additional revolutions can be reduced from the 16% increase when taking an additional pass for each servowriting step. As discussed above, a standard self-servowriting process can include about nineteen revolutions per datatrack, so adding one additional revolution per data track only adds about 5% to the self-servowriting time, which is much less expensive than servowriter time. Alternatively, the burst trimming and/or burst writing operations could be done in multiple passes for every third servowriting step. For example, if the burst to be trimmed were trimmed in two passes and the burst to be written were written in two passes, but only for every data track center, or every third servowriting step in a three-pass-per-track servo pattern, this would add 3 additional revolutions per data-track, resulting in an additional overhead of 16%. This is the same additional overhead that would be suffered if a single additional pass were used for every servowriting step. In this case, however, the RRO at the critical location will be improved, relative to that obtained with a single additional pass, while that RRO at other locations will be relatively degraded. Many more combinations of different numbers of additional passes at different servowriting steps are possible.

Different Numbers of WORF Revolutions at Different Boundaries

Just as the number of burst writing passes used per servowriting step can vary from one burst boundary to another, the number of revolutions used to collect PES information to determine the written-in runout of the reference pattern can also vary similarly. If, for example, five revolutions of PES data collection would normally be used to determine the written-in runout at each burst boundary, a drive can collect nine revolutions of data before writing a burst boundary that determines the write track center of the final pattern, but may use only three revolutions to collect data before writing other boundaries. This exemplary approach could still consume fifteen revolutions per servowritten data-track, three revolutions for each of two boundaries plus nine revolutions for the third. The removal of written-in runout of the reference pattern, and hence the quality of the final pattern boundaries, could be improved at the critical boundaries and degraded at the non-critical boundaries, with no change in the overall self-servowriting time. For another example, if five revolutions of PES data collection were used at the non-critical boundaries and ten revolutions were used at the critical boundary, the written-in runout at the critical boundary could be improved without any degradation of the non-critical boundaries, at the cost of an additional five revolutions per servowritten data-track.

Additional Servo Pattern Component(s)

In other embodiments, it is possible to extend a servo pattern such as those described above, and use that extended pattern with multi-pass servowriting. As mentioned above, it is possible to write bursts in multiple passes by writing at least a portion of a burst during each pass. A problem exists, however, in that it can be difficult to coherently write separate portions of the same burst. If there is some incoherence between the portions, demodulating the burst by a process such as taking a discrete Fourier transform (DFT) of the whole burst can return a result of approximately zero if the two portions are sufficiently out of phase. Writing the bursts in separate passes and reading them in the same pass may then result in adding as much RRO as is being saved, or even possibly degrading the RRO.

Figure 11:
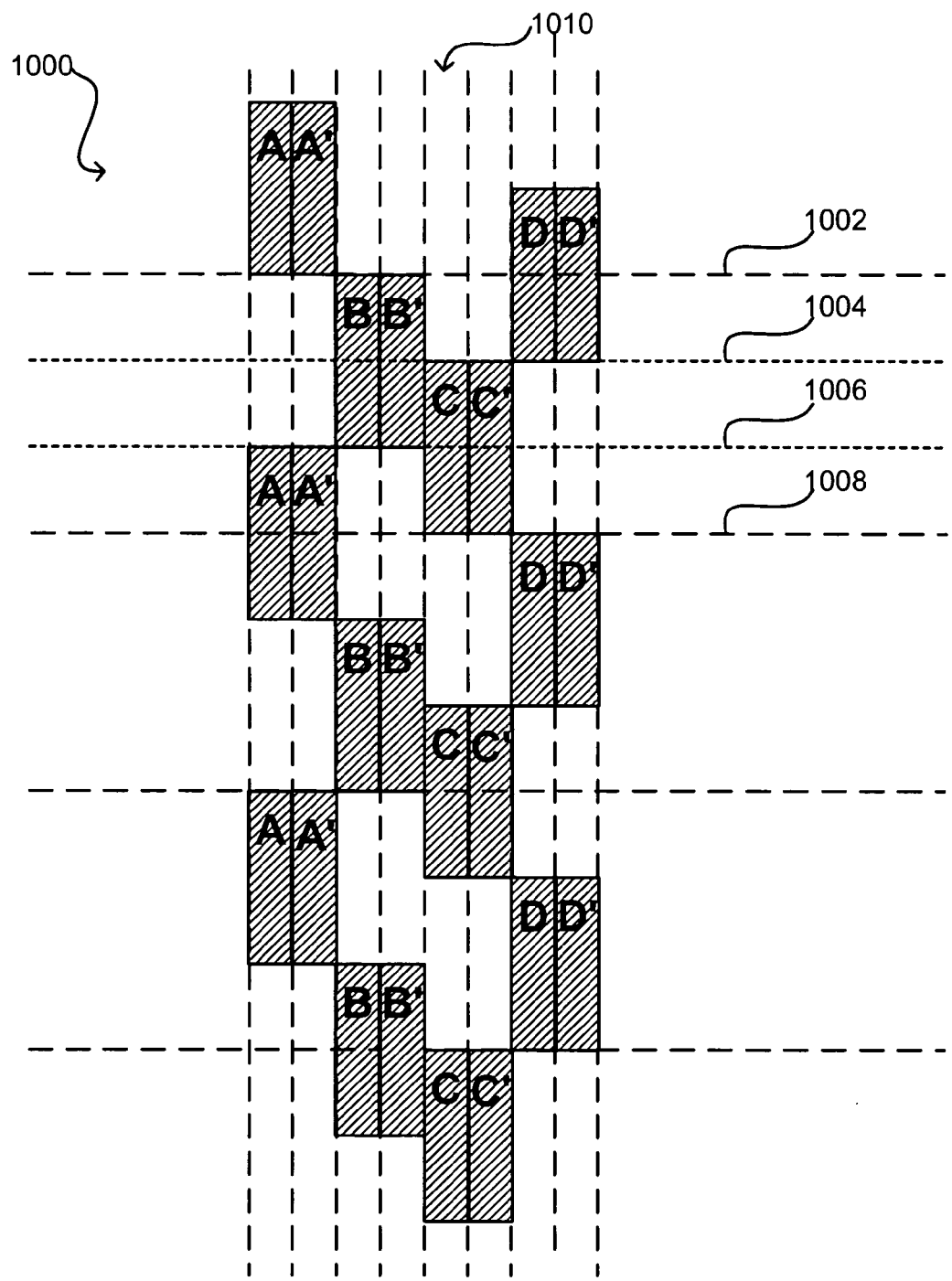
FIG. 11 is a diagram of a servo-burst pattern that can be used in accordance with embodiments of the present invention.
Figure 12:
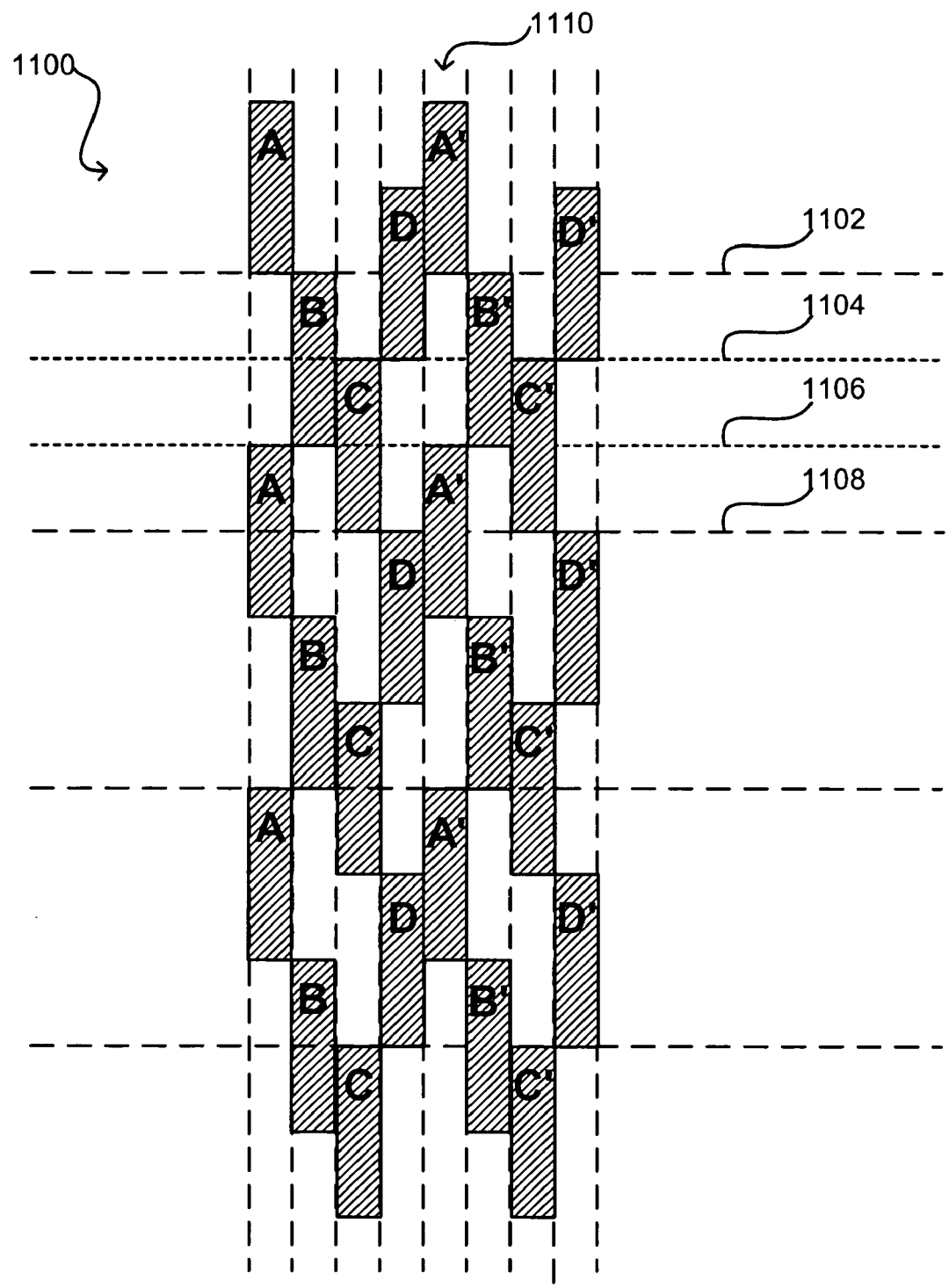
FIG. 12 is a diagram of another servo-burst pattern that can be used in accordance with embodiments of the present invention.

One way to avoid such a coherence problem is to write separate bursts, instead of writing separate portions of the same burst. In one approach, a second burst can be written for each burst on every track. This is shown, for example, in FIGS. 11 and 12. In FIG. 11, there is an additional burst written for each burst in the pattern. Track centerline 1002 is then defined by not only an A/B boundary, but is defined by an AA'/BB' boundary. The M'/BB' boundary includes the lower edge of an A-burst and a companion burst that shall be referred to herein as an A'-burst, and the pair of edges will be referred to as AA'. The B-burst also has a companion burst, referred to as a B'-burst, and the pair is referred to herein as BB'. A coherence problem can still exist in such a pattern if the A-burst and A'-burst are demodulated as a single burst. However, if they are demodulated separately, such as by applying a separate DFT demodulation to each burst individually, such problems can be avoided.

An aspect to such a demodulation scheme that might be undesirable, however, is the fact that the scheme requires eight separate servo bursts, and eight separate burst demodulations for each servo wedge. This may be undesirable for a number of reasons. First, not all drives may have the chips or circuitry necessary to handle eight bursts. More important, however, will be the fact that manufacturers would rather not give up the disk capacity necessary to add the additional four burst regions to have an additional burst for each burst in a servo wedge.

Figure 13:
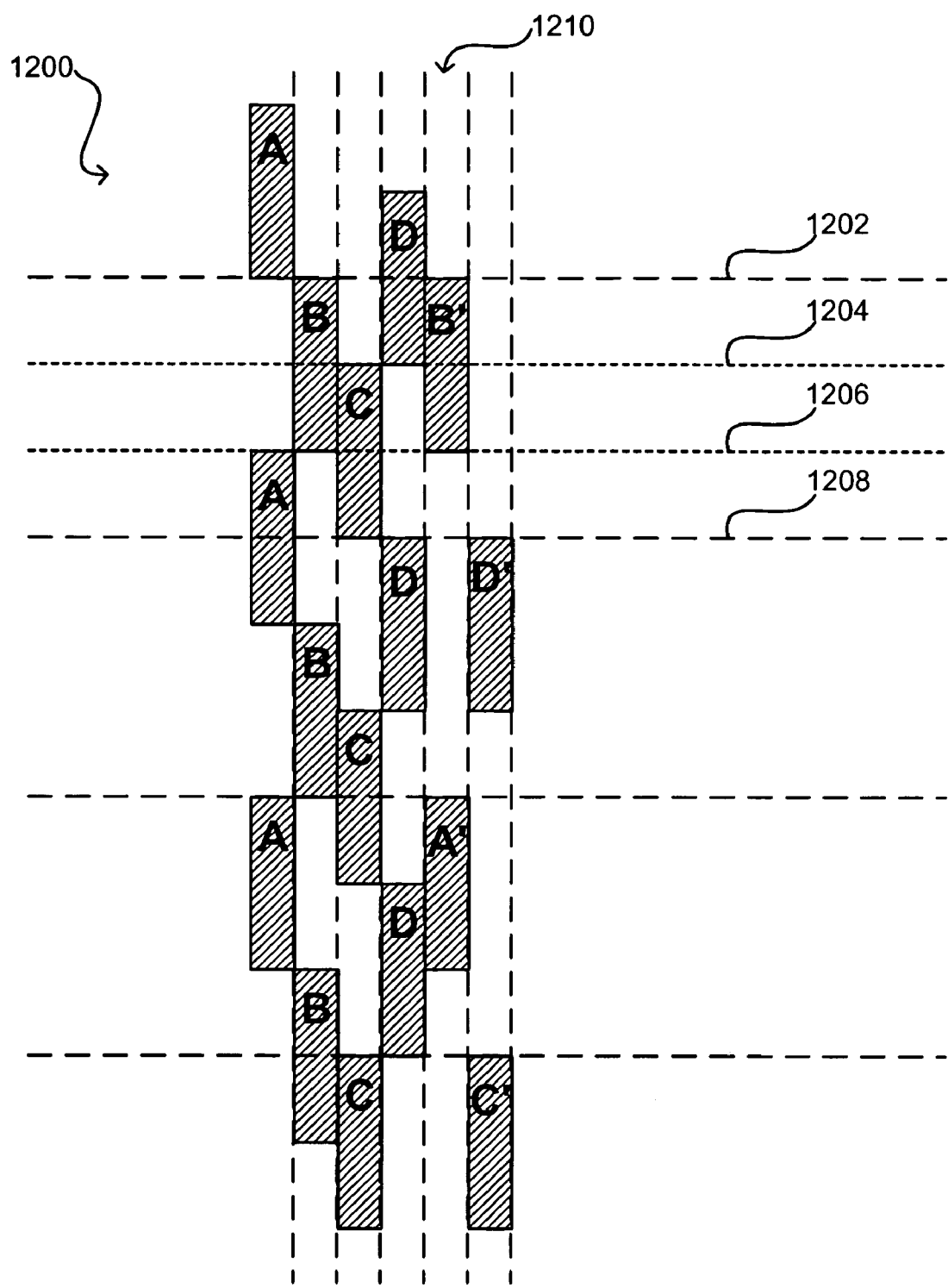
FIG. 13 is a diagram of another servo-burst pattern that can be used in accordance with embodiments of the present invention.

One way to address such a concern is shown in FIG. 13. The pattern shown in FIG. 13 only uses six servo burst regions, or two more than are used in a nominal four-burst pattern. This pattern takes advantage of the fact that it is relatively safe to trim a burst in multiple portions. Taking this advantage into consideration, it is possible to have four edges used for each boundary but only write one additional burst. For example, track centerline 1202 is defined by an A/BB' burst. The addition of the B'-burst means that two bursts are written on separate passes, with the upper edge of each burst capable of being used for the PES without coherence concerns. It is still possible, however, to trim the A-burst in at least two passes, such that the overall written-in runout is reduced. The two edge portions of the trimmed A-burst, as well as the edges of the B and B' bursts, still provide four edges for the PES, although the PES noise from the A-burst edge portions may be greater than if there were two complete burst edges used.

In order to save servo time, as well as to address interference concerns, it is possible to simply add a complimentary servo burst for each data track centerline, instead of each servowriting step. As shown in the example of FIG. 13, a B' burst is written for the boundary defining track centerline 1202, and a D' burst is written for the boundary defining track centerline 1208, but there is not an additional burst for the boundaries defining read lines 1204 and 1206. This allows the additional bursts to be written using only two additional burst regions 1210, for a total of six burst regions. In the Figure, for example, the B'-bursts and A'-bursts are written in the same burst region, while the C'-bursts and D'-bursts are written in another burst region.

In certain embodiments, it may be possible to write all the additional bursts in the same burst region. This may not be desirable for today's drives, however, since that would allow only one-third of a data track between the bursts, each of which is about two-thirds of a data track in width. Since the width of a read/write element can be about as wide as a data track, any misplacement of the head and/or servo data could result in an incorrect value of PES being determined, as there would be a contribution due to the detection of a portion of a servo burst for an adjacent track. Further, if the reader is any wider than a third of a track, the amplitude of the signal read from the additional bursts will never go to zero, but will always read some amplitude. This can introduce some uncertainty into the measured PES values.

Although embodiments described herein refer generally to systems having a read/write head that can be used to write bursts on rotating magnetic media, similar advantages can be obtained with other such data storage systems or devices. For example, a laser writing information to an optical media can take advantage of additional passes when writing position information. Any media, or at least any rotating media, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for writing position information to a rotatable medium, comprising:
   selecting a pattern comprising a plurality of concentric tracks, wherein each concentric track is defined by a plurality of burst boundaries positioned circumferentially about a rotatable storage medium;
   writing a first servo burst and a second servo burst for each burst boundary to the rotatable storage medium, wherein the first servo burst and second servo burst are written on separate passes of a write element over the rotatable storage medium, and wherein the first servo burst and second servo burst each have an edge that can be used to determine the position of the write element during a subsequent pass over those servo bursts; and
   trimming the first servo burst for each burst boundary, wherein a subset of the plurality of concentric tracks is selected wherein the burst boundaries defining that subset use a separate pass of the write element to trim the first servo burst.

2. A method according to claim 1, further comprising:
   using the trimmed edge of the first servo burst and an adjacent edge of the second servo burst to determine the position of the write element.

3. A method according to claim 1, wherein:
   trimming the first servo burst includes trimming the first servo burst to have a width approximately equal to the width of a track of servo data.

4. A method according to claim 1, wherein:
   the first and second servo bursts are contained in a servo wedge on the rotatable storage medium.

5. A method according to claim 1, wherein:
   the trimmed edge of the first servo burst and an adjacent edge of the second servo burst define the position of a centerline of a data track on the rotatable storage medium.

6. A method according to claim 5, wherein
   the centerline of a data track defined by the first and second servo bursts is a member of the subset.

7. A method according to claim 1, wherein:
   writing the second servo burst occurs before trimming the first servo burst.

8. A method for writing position information to a rotatable storage medium having servo tracks and data tracks written thereon, comprising:
   writing a plurality of servo tracks to a rotatable storage medium, wherein the position of each servo track is defined by an edge of a first servo burst and a complimentary edge of a second burst, and wherein the first servo burst is written in a first revolution of the rotatable storage medium, and the first burst is trimmed on a second revolution, the second servo burst also being written on the second revolution; and
   writing a plurality of data tracks to a rotatable storage medium, wherein the position of each data track is defined by an edge of a third servo burst and a complimentary edge of a fourth servo burst, and wherein the third servo burst is written in a third revolution of the rotatable storage medium, the third servo burst is trimmed in a fourth revolution, and the fourth servo burst is written in a fifth revolution.

9. A method for writing position information to a rotating medium, comprising:
   writing at least a portion of a first burst pattern during a first pass of a write element over a rotating medium;
   trimming at least a portion of a first burst pattern during a second pass of the write element;
   writing at least a portion of a second burst pattern during a third pass of the write element if the first burst pattern and second burst pattern are used to define a track centerline; and writing at least a portion of a second burst pattern during the second pass of the write element if the first burst pattern and second burst pattern are used to define a track boundary line.

10. A method for writing servo information to a magnetic disk, comprising:
    writing a first servo burst during a first pass of a read/write head over a magnetic hard disk;
    trimming the first servo burst during a second pass of the read/write bead, the first servo burst being trimmed so as to have a trimmed edge in about a predetermined position on the magnetic disk;
    writing a second servo burst during the second pass of the read/write head if the first servo burst and second servo burst are used to define a track boundary; and
    writing a second servo burst during a third pass of the read/write head if the first servo burst and second servo burst are used to define a track centerline, wherein the trimmed edge of the first servo burst and an adjacent edge of the second servo burst define a position that can be used to adjust the radial location over the disk of the read/write head during subsequent passes over those bursts.

11. A method for manufacturing a hard disk drive, comprising:
    providing means for writing a first servo burst during a first pass of a read/write head over a magnetic hard disk;
    providing means for trimming the first servo burst during a second pass of the read/write head, the first servo burst being trimmed so as to have a trimmed edge in about a predetermined position on the magnetic disk;
    providing means for writing a second servo burst during the second pass of the read/write head if the first servo burst and second servo burst are used to define a track boundary; and
    providing means for writing a second servo burst during a third pass of the read/write head if the first servo burst and second servo burst are used to define a track centerline.

* * * * *